United States Patent [19]

Chiarelli et al.

[11] Patent Number: 5,164,540
[45] Date of Patent: Nov. 17, 1992

[54] SLIPPING DRIVING BAND FOR PROJECTILES OF ANY CALIBER

[75] Inventors: Francois A. Chiarelli, Bourges; Jean-Louis R. Chazeirat, La Chapelle Saint Ursin, both of France

[73] Assignee: Giat Industries, France

[21] Appl. No.: 738,518

[22] Filed: Jul. 31, 1991

[30] Foreign Application Priority Data

Dec. 19, 1990 [FR] France .................. 90 15962

[51] Int. Cl.⁵ ........................................ F42B 14/02
[52] U.S. Cl. .................. 102/526; 102/521; 102/703
[58] Field of Search ............ 102/501, 520–527, 102/703

[56] References Cited

U.S. PATENT DOCUMENTS

| 3,613,596 | 10/1971 | Walde | 102/524 |
|---|---|---|---|
| 4,109,582 | 8/1978 | Haep et al. | 102/526 |
| 4,307,666 | 12/1981 | Baran | 102/525 |
| 4,736,666 | 4/1988 | Hillebrenner et al. | |
| 4,833,995 | 5/1989 | Gotz et al. | 102/524 |
| 4,907,513 | 3/1990 | Manion et al. | |

FOREIGN PATENT DOCUMENTS

| 67200 | 3/1940 | Czechoslovakia | 102/520 |
|---|---|---|---|
| 3735737 | 5/1989 | Fed. Rep. of Germany | |
| 2606869 | 5/1988 | France | |
| 289179 | 8/1935 | Italy | 102/525 |
| 578616 | 7/1946 | United Kingdom | 102/520 |

Primary Examiner—Harold J. Tudor
Attorney, Agent, or Firm—Parkhurst, Wendel & Rossi

[57] ABSTRACT

The technical field of the invention is that of slipping driving bands fitted to projectiles of any caliber fired from a rifled barrel. The slipping driving band according to the invention consists of a driving band boby 8 and a front ring 7 arranged in a circumferential groove 6 of the projectile 1 and separated by an axial gap 12, and is characterized by the fact that the bottom of the groove 6 has a tapered seat 9, the angle of which opens towards the rear of the projectile and that the driving band body 8 has an internal profile complementary with that of the tapered seat 9. The present invention is particularly suited to discarding sabot projectiles of medium caliber.

3 Claims, 5 Drawing Sheets

SLIPPING DRIVING BAND FOR PROJECTILES OF ANY CALIBER

BACKGROUND OF THE INVENTION

The technical field of the present invention is that of slipping driving bands fitted to projectiles of any caliber fired from a rifled barrel.

In order to stabilize a projectile in its trajectory, use is made either of the gyroscopic effect or of fins.

The gyroscopic effect requires the projectile to be given a substantial spin during firing, this spin being provided by the barrel of the weapon which is heavily rifled.

Fin stabilization is obtained by means of fins projecting to the rear of the projectile thus generating a counter-torque in the trajectory. This type of projectile is fired either from rifled barrels or from smooth bore barrels. This type of stabilization is used essentially for ammunition the effect of which is chemical (hollow charge rounds) or kinetic (discarding-sabot rounds).

To allow this type of projectile to be fired from rifled barrels, engineering designs having been developed by different countries including France. The concept most frequently used is based essentially on limiting the spin of the projectile during the firing phase by means of a so-called slipping driving band which follows the rifling in the barrel while imparting only a slight spin to the projectile through a sliding friction. The concept of the slipping driving band is the one most often used for firing kinetic energy rounds of the discarding sabot type from rifled barrels.

Reference will be made for example to patent FR2606869 which describes such a slipping driving band consisting of an underring, a front ring and a driving band body in two half-shells assembled by bolts or by hot forming. Such an arrangement is difficult to adapt to a medium or small caliber projectile. The assembly of a driving band body from two bolted half-shells is costly and delicate to effect on small parts. If assembly involves hot forming a band using a plastic material, the residual clearance obtained after cooling is difficult to reproduce.

U.S. Pat. No. 3834314 provides for the discarding sabot projectile being fitted with a driving band which, under the gas pressure, slides on a tapered section, the angle of which is open towards the front of the projectile. Sliding has the result of compressing the ring between the tapered sabot and the rifling of the weapon barrel and provides the desired seal although to the detriment of suitable sliding of the band on the projectile.

SUMMARY OF THE INVENTION

The aim of the present invention is to avoid the above-mentioned disadvantages by proposing a slipping driving band imparting only slight spin to the projectile while ensuring a good seal in the weapon barrel.

Another aim of the present invention is to propose a process of manufacturing this driving band by casting which is particularly economic.

Thus the subject of the invention is a slipping driving band for a projectile comprising a band body and a front ring arranged in a circumferential groove on the projectile and separated axially; this band is characterized by the fact that the bottom of the groove has a tapered seat, the angle of which is open towards the rear of the projectile and that the band body has an internal profile complementary to that of the tapered seat.

By means of such an arrangement it is possible to produce such a band by injection while ensuring a reproducible radial clearance and hence freedom of the band body to spin relative to the projectile, despite the material of the band body being shrunk on the projectile.

The bottom of the groove will preferably have a cylindrical seat on which the front ring will rest and this cylindrical seat may consist of the bottom of a cylindrical groove.

The subject of the invention is also a process of manufacturing such a band, characterized by the fact that the projectile is arranged in a mold such that the band body and the front ring are obtained simultaneously by injecting a thermoplastic material. Such a process is particularly economic since it requires only a single injection operation.

The manufacturing process will with advantage consist of the following stages:

Pre-heating the different parts of the mold and the projectile to a temperature between 86° and 94°, Fitting the projectile in the mold and clamping it in place, Injecting 6—6 polyamide at a temperature between 300° and 310°, and at a pressure between 800 and 900 megapascals, Cooling for at least 30 seconds, Demolding.

The final subject of the invention is the mold used for implementing this process, characterized by the fact that it possesses a wall or partition designed to come into contact with the bottom of the groove thus forming two separate chambers in the band groove and that it includes an injection passage feeding the two chambers simultaneously.

The wall is preferably supported by two shell components designed to be assembled around the projectile at the position of the band groove, these shell components having an internal profile allowing the band body to be obtained, and at least one shell component having an approximately radial injection hole leading to the internal profile.

According to a particular method of manufacture, the shell components have a second internal profile allowing the front ring to be obtained and at least one shell component has a second injection hole opening on to this second internal profile and communicating with the first injection hole.

The mold consists with advantage of a lower part designed to accommodate the projectile, and an upper part which can be clamped on the lower part so as to immobilize the projectile carrying the shell components.

In a variant version, the injection passage consists of a semi-channel in the lower part, extending as far as the projectile groove, and a semi-channel in the upper part communicating with the first injection hole in the shell component.

An advantage of the present invention lies in the fact that the clearance between the driving band and the projectile is constant and reproducible from one round to another, which does not affect the performance of the weapon system.

Another advantage lies in the fact that this clearance is maintained over a range of temperature from −50° to +70°.

Another advantage is the absence of any mechanical fitting of the driving band, only a casting operation being necessary which reduces the cost of production.

Other advantages of the invention will become clearer from the additional description provided as an illustration in conjunction with the attached drawings.

DETAILED DESCRIPTION OF THE INVENTION

The remainder of the description will describe the application of the driving band according to the invention to a discarding sabot projectile of medium caliber, for example 25 mm, fired from a rifled barrel. However this driving band may be adapted to any type of round whether it be of small, medium or large caliber.

Figure 1:
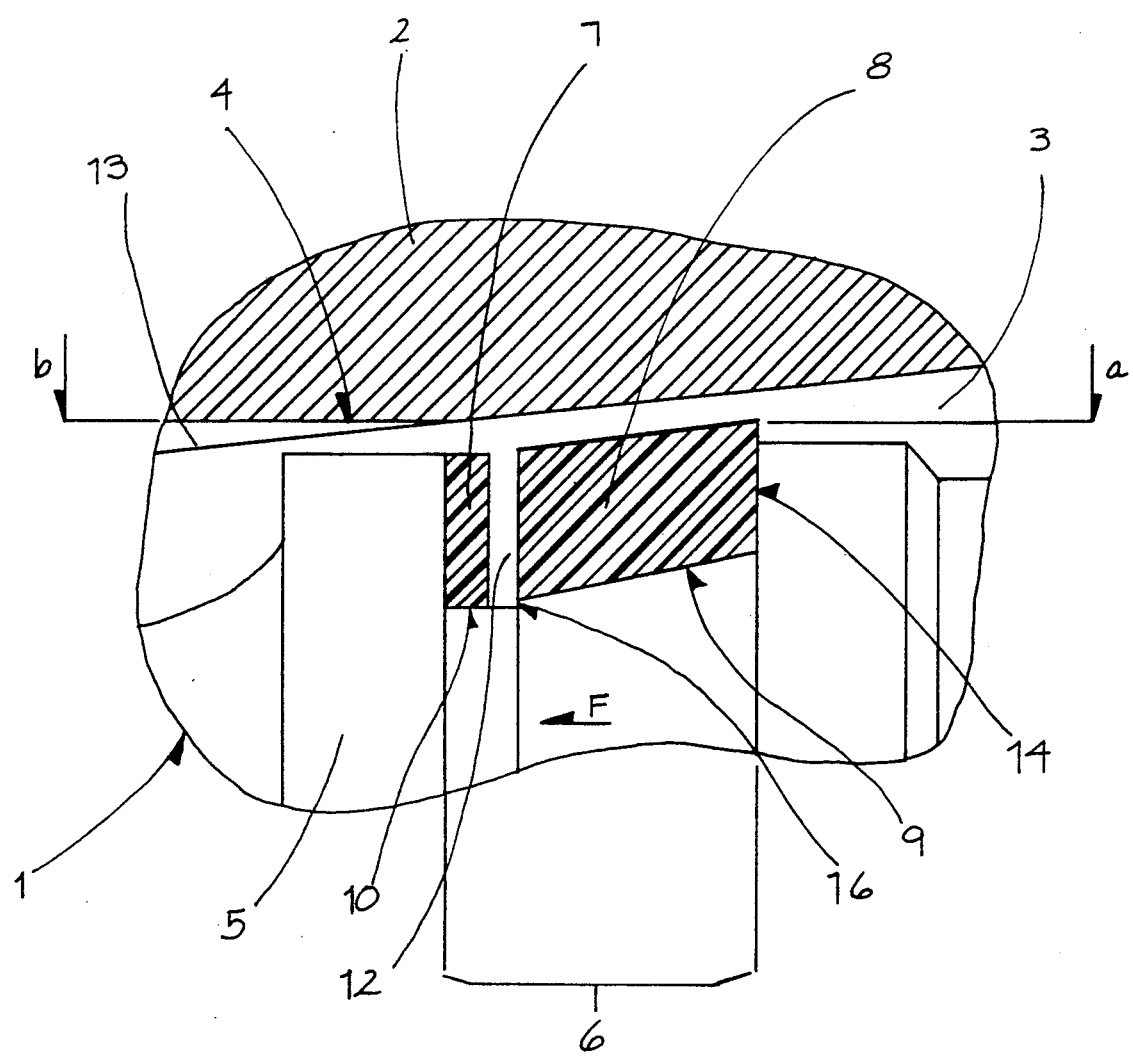
FIG. 1 shows a partial section of the projectile and slip driving band.

FIG. 1 shows a partial representation of a projectile 1 placed in the barrel of a weapon 2 at the position of a chamber 3 and a squeezing cone 4. The projectile 1 consists of a sabot 5 made up of several segments surrounding a sub-projectile (not shown). The sabot has a circular groove 6 around its circumference intended to accommodate a driving band.

The driving band according to the invention consists of a band body 8 arranged on a tapered seat 9 at the bottom of the groove 6, and a front ring 7 fitted on a cylindrical seat 10 at the bottom of the groove 6 and pressing against a wall 11. The ring is separated from the driving band body by an axial gap 12.

Figure 4:
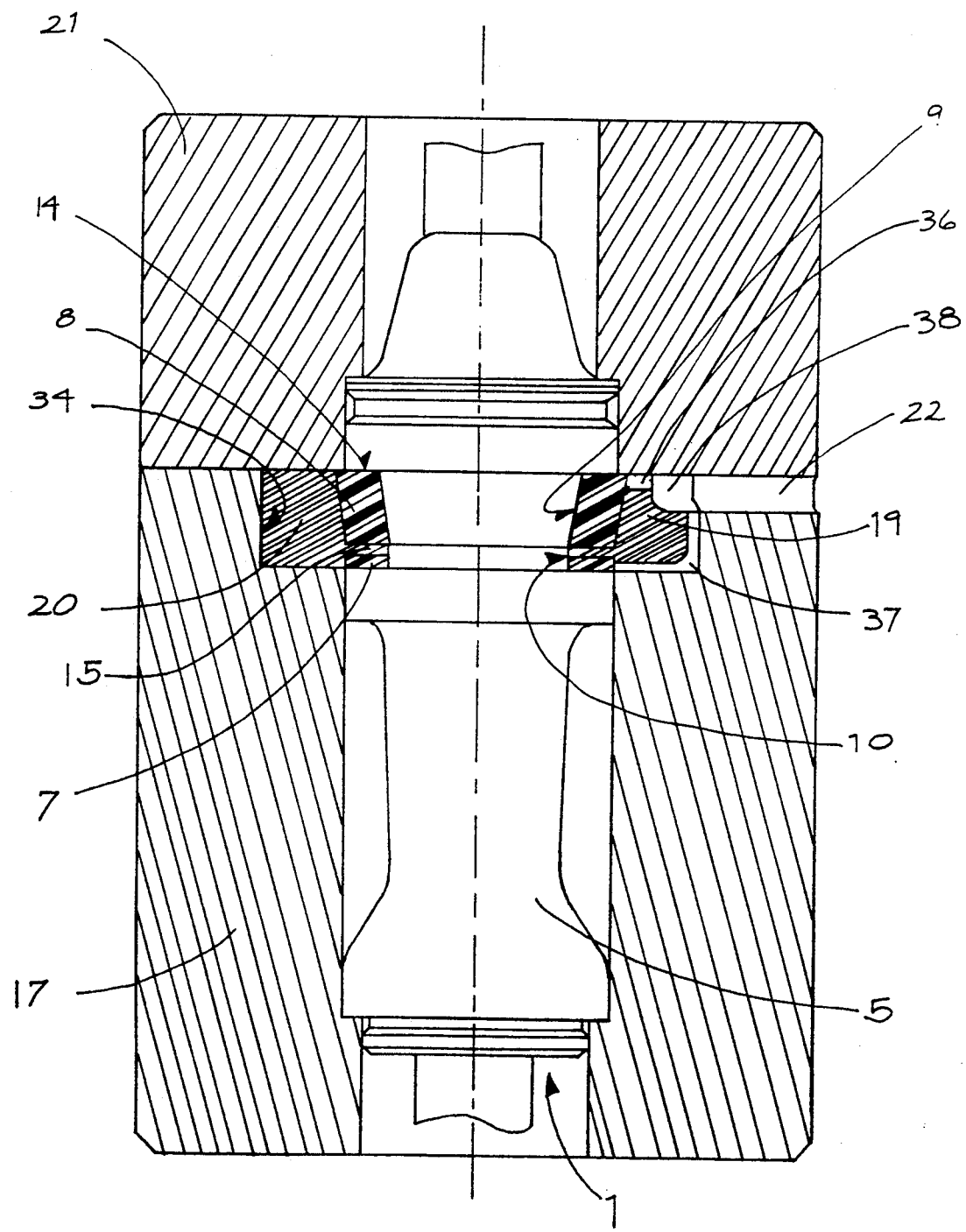
FIG. 4 shows a variant mold for obtaining the driving band.

The cylindrical seat 10 may as shown here be the bottom of a cylindrical groove, but it would be possible to arrange a cylindrical seat whose diameter is the smallest diameter of the tapered zone 9. Such a variant would reduce the costs of machining the driving band groove 6 and avoid embrittling the sabot. FIG. 4 shows a sabot fitted with a driving band conforming with such a variant.

Returning to FIG. 1, it can be seen that the outside diameter (a) of the driving band body 8 is slightly greater than the diameter (b) of the rifling 13 in the barrel 2 (difference in diameters of the order of 0.2 mm), and that its outer profile is complementary to that of the squeezing cone 4.

The driving band body 8 and the front ring 7 are made of conventional plastic materials of the polyamide type, for example, a 6—6 polyamide.

A process for manufacturing this driving band will be described subsequently.

Operation of the driving band is as follows.

When the round is fired, the body of the slipping driving band 8 is pushed forward in the direction F until it is stopped by the front ring 7. The projectile and the driving band move forward until the latter comes into contact with the squeezing cone 4. There is then a slight recoil of the driving band body 8 with respect to the projectile 1 until it is stopped by a wall 14 of the groove 6. The projectile then entrains the driving band, thus causing the driving band body to engage the rifling. This engagement is very important to provide a seal for the propellant gases during the firing phase.

During the firing phase, the driving band body 8 spins at the speed matching the barrel rifling. The gas pressure exerted on the back of the driving band body 8 moves it forward and brings it into contact with the front ring 7. In this way a radial clearance is obtained between the driving band body 8 and the tapered seat 9. A seal is provided and the projectile is given a slight spin through contact of the driving band body 8 with the front ring 7.

On leaving the barrel, under the effect of the centrifugal forces applying to the driving band body 8 and to a lesser degree to the front ring 7, these components break up into small pieces, thus releasing the different parts of the sabot 5 and the procedure of sabot-projectile separation can then begin.

Hence with a taper of the order of 53.6% for the tapered seat 9 and an axial clearance 12 of 1 mm, a radial clearance between the driving band body 8 and the sabot 5 of between 09.2 and 0.36 mm is obtained after shrinkage of the constituent material of the driving band.

The clearance remains between these values in a reproducible manner whatever the shrinkage conditions which is particularly attractive from the point of view of production quality.

Such a clearance imparts a spin of about 50,000 rpm to the projectile whereas with a conventional non-slipping driving band the spin imparted is about 140,000 rpm (25 mm caliber projectile).

The driving band according to the invention is preferably obtained by means of a manufacturing process in which the projectile is arranged in a mold allowing the driving band body and the front ring to be obtained simultaneously by injection of a thermoplastic material which for preference will be 6—6 polyamide.

Such a process allows economic production of the driving band according to the invention since it requires only one molding operation.

Figure 2:
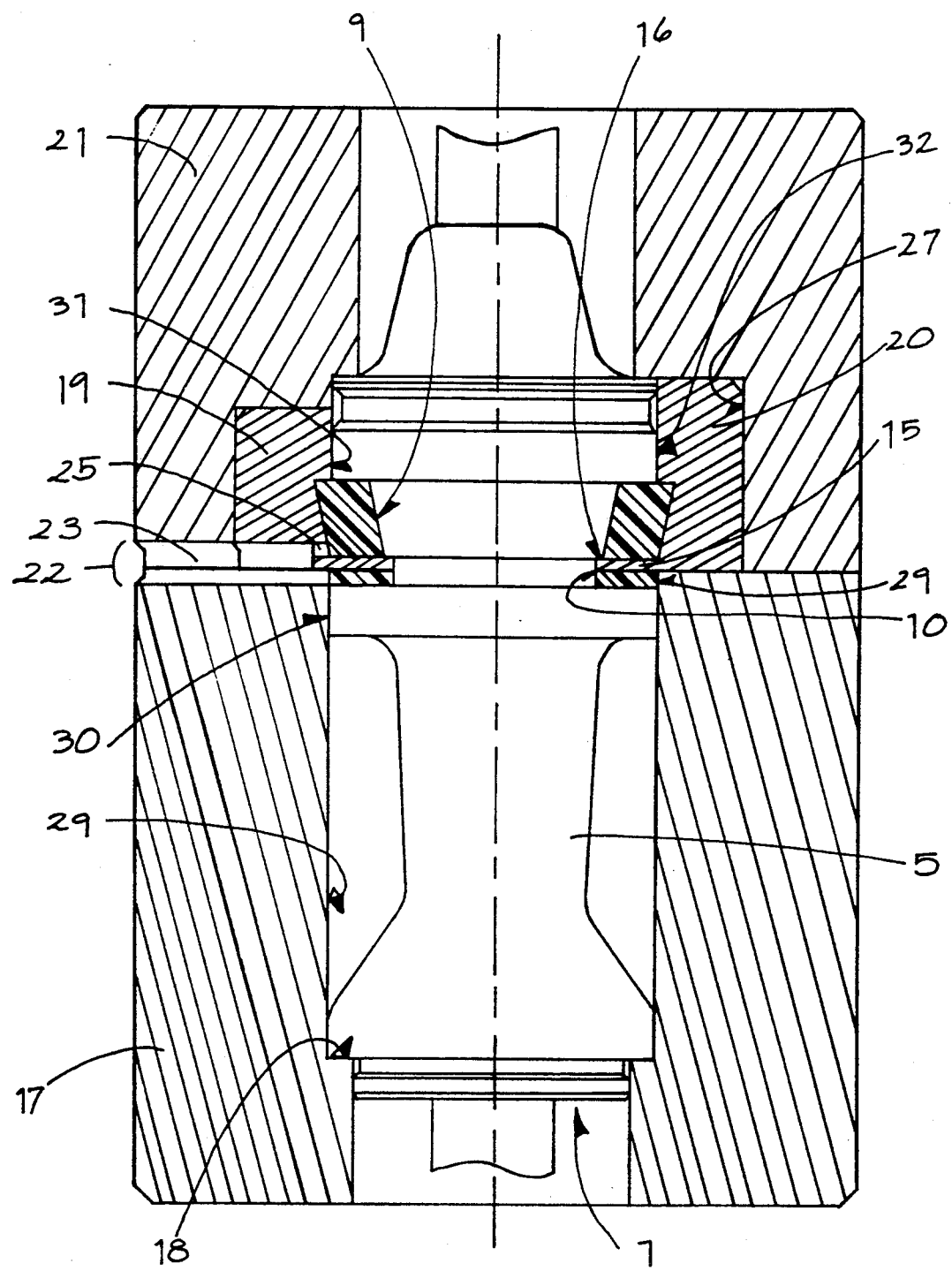
FIG. 2 shows the mold for producing the driving band.

The implementation of the process necessitates a special mold which will now be described with reference to FIG. 2 which shows the mold after injection of the driving band on the projectile.

This mold consists essentially of a wall 15 which comes into contact with the cylindrical seat 10 and the lateral surface 16 of the groove adjoining the tapered seat 9. This wall is intended to form two separate chambers at the position of the groove 6, one allowing injection of the driving band body 8 and the other injection of the front ring 7. The projectile is arranged in a lower part 17 and bears against a shoulder 18 of the latter. Two shell elements 19 and 20, which support the wall 15, are arranged at either side of the sabot and held in position by an upper part 21.

The entire mold is then clamped (clamping not shown). The driving band body 8 and the front ring 7 are injected through an injection passage 22 made up of the two semi-channels 23 and 24, made respectively in the upper part 21 and the lower part 17, parts which must be positioned precisely in azimuth with respect to one another. This passage 22 communicates with an injection hole 25 made in the shell element 19.

Figure 3A:
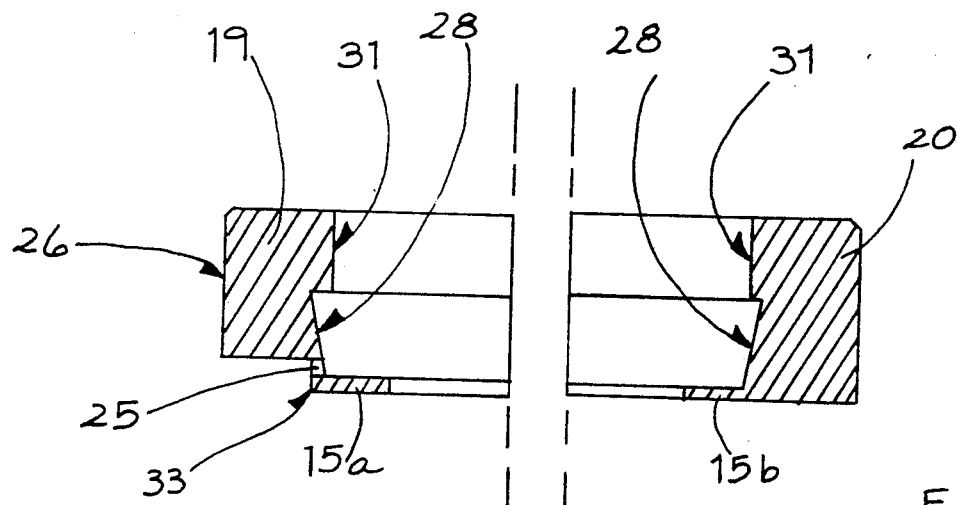
FIGS. 3a and 3b show a characteristic part of the mold.
Figure 3B:
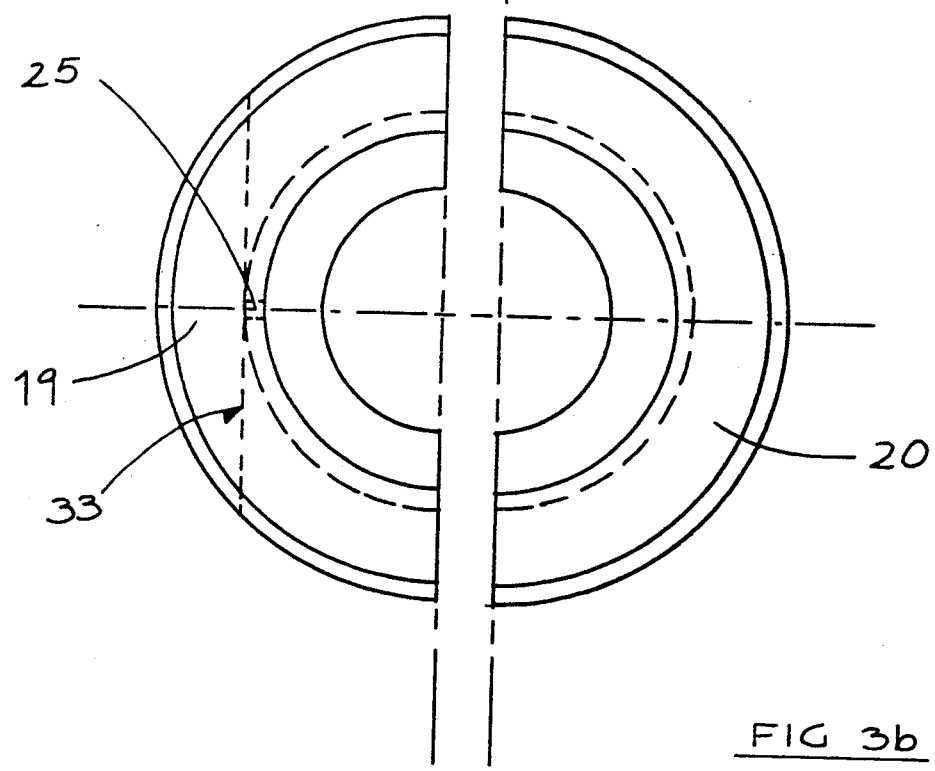

FIGS. 3a and 3b show the two shell elements 19 and 20 in detail.

The latter after assembly have an outside cylindrical profile 26 which fits into a bore 27 of the upper part 21.

The wall 15 consists of two wall elements 15a and 15b, the assembly of the two shell elements around the projectile forming the wall 15, the thickness of which will be chosen to be equal to the desired axial gap 12 between the drive band body and the ring. The wall 15 forms two separate chambers at the position of the groove 6.

In this particular method of making the mold, the first chamber is bounded by the internal section 28 and the wall 15 of the two shell elements 19 and 20, and by the wall 14 and the tapered seat 9 of the groove 6 in the sabot. It allows the driving band body 8 to be obtained by injection. The second chamber is bounded by the wall 15, the bore 29 in the lower part 17 and by the cylindrical seat 10 and the wall 11 of the groove 6 in the sabot. It allows the front ring 7 to be obtained by injection.

In order to avoid any leakage of material during injection, the wall 15 is fitted to the cylindrical seat 10 and to the lateral surface 15 of the cylindrical groove, the bore 29 in the lower part 17 is fitted to the cylindrical surface 30 in the sabot 5, and the bore 31 in the two shell elements 19 and 20 is fitted to the corresponding cylindrical surface 32 of the sabot 5.

The injection hole 25 is made in the shell element 19 in an approximately radial direction. This hole opens at one end on the inside surface of the element 19, and at the other on a notch 33. Such an arrangement, by reducing the length of the hole 25, facilitates, during demolding, the separation of the driving band body 8 from the plastics material filling the injection passage 22. During assembly of the mold the notch 33 will be positioned opposite the semi-channel 23.

The molding process according to the invention consists of the following stages:

separate pre-heating of the mold (consisting of the lower part 17, the upper part 21 and the two shell elements 19 and 20) and the projectile 1 to a temperature between 86° and 94°, fitting of the projectile 1 into the mold in the configuration described above, injection of the material through the injection passage 22, the material being at a temperature between 300° and 310° with an injection pressure at the mold inlet of between 800 and 900 megapascals, demolding after at least 30 s of cooling.

Since molding causes a shrinkage of the material, the front ring 7 becomes pressed against the cylindrical seat 10. In this way it retains the different segments of the sabot 5. The driving band body 8 is itself also subject to shrinkage and becomes pressed on the tapered seat 9. However during molding, when the two shell elements 19 and 20 are removed, the axial gap 12 which was previously filled by the wall 15 allows the driving band body 8 to slide along the tapered seat 9 towards the front of the projectile in the direction F, thus producing the radial clearance between the driving band body 8 and the groove 6.

FIG. 4 illustrates another mold for producing the preferred variant of the driving band according to the invention in which the diameter of the cylindrical seat 10 accommodating the front ring 7 is equal to the smallest diameter of the tapered seat 9.

The mold allowing such a driving band to be obtained still has a wall 15 forming two chambers, one allowing injection of the driving band body 8 and the other injection of the front ring 7.

Figure 5A:
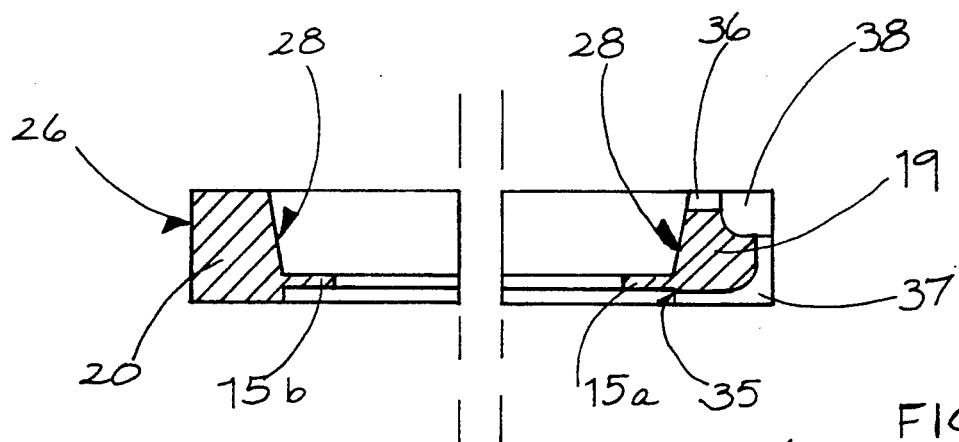
FIGS. 5a and 5b show a characteristic part of the mold of FIG. 4.
Figure 5B:
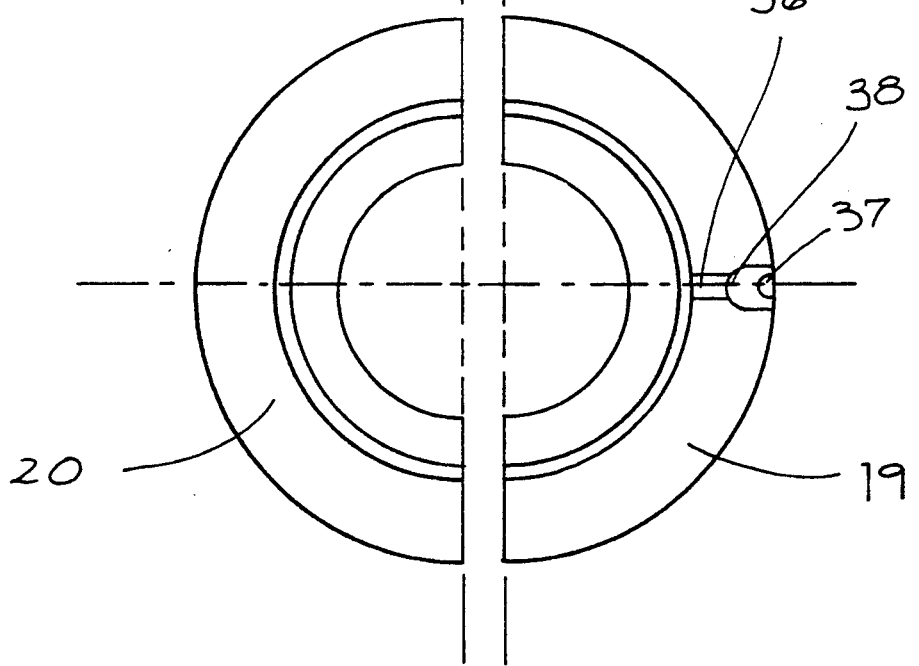

The shell elements adapted to this variant are shown in FIGS. 5a and 5b. As before, they have after assembly an external cylindrical profile 26 which fits into a bore 34 made this time in the lower part 17.

The first chamber into which the driving band body 8 will be injected is bounded by the wall 15 and a first internal profile 28 of the shell elements and by the wall 14 and the tapered seat 9 of the sabot, and partly by the upper part 21. The second chamber into which the front ring 7 will be injected is bounded by the wall 15 and a second internal profile 35 of the shell elements, and by the wall 11 and by the cylindrical seat 10 of the sabot.

A first injection hold 36 is made in the shell element 19 in an approximately radial direction and opening on the first internal profile 28. This hole shows here an open semi-cylindrical profile which will be closed by the upper part 21 during fitting.

This shell element also has a second injection hole 37, formed by two open semi-cylindrical channels which are perpendicular to one another. The second injection hole opens on the second internal profile 35 and communicates with the first hole at the position of a feed chamber 38.

The semi-cylindrical channels are closed during fitting by the lower part 17. The feed chamber 38 is positioned opposite the injection passage 22 which is made in the lower part 17 and which also has a semi-cylindrical shape closed during fitting by the upper part 21.

Such an arrangement obviates machining an injection passage in the upper part.

The angular indexing of these two parts is therefore no longer necessary, which facilitates assembly of the mold and reduces production costs.

We claim:

1. A projectile having a slip driving band, comprising:
    a projectile having a circumferential groove formed therein, a first portion of a bottom of said circumferential groove defining a tapered seat having an angle which opens towards a rear of the projectile;
    a driving band body arranged in said circumferential groove and having an inner surface complementary to said tapered seat, said driving band body slipping in said circumferential groove; and
    a front ring arranged in said circumferential groove axially spaced from said driving band body.

2. The projectile of claim 1, further comprising a second portion of said bottom of said circumferential groove defining a substantially cylindrical seat on which said front ring is fitted.

3. The projectile of claim 2, wherein said second portion of said bottom of said circumferential groove is the bottom of a cylindrical groove.

* * * * *